US008224945B2

(12) United States Patent
Lee et al.

(10) Patent No.: US 8,224,945 B2
(45) Date of Patent: Jul. 17, 2012

(54) MEMORY MANAGEMENT SYSTEM AND METHOD FOR OPEN PLATFORM

(75) Inventors: Kuen-Ming Lee, Hsinchu (TW); Jenn-Lien Chu, Hsinchu (TW); Po-Chou Su, Hsinchu (TW)

(73) Assignee: Industrial Technology Research Institute, HsinChu (TW)

( * ) Notice: Subject to any disclaimer, the term of this patent is extended or adjusted under 35 U.S.C. 154(b) by 98 days.

(21) Appl. No.: 12/344,028

(22) Filed: Dec. 24, 2008

(65) Prior Publication Data

US 2009/0172158 A1    Jul. 2, 2009

(30) Foreign Application Priority Data

Dec. 27, 2007 (TW) ................................ 96150653 A

(51) Int. Cl.
 *D06F 15/173* (2006.01)
(52) U.S. Cl. ........ 709/223; 709/212; 709/213; 709/214; 709/216; 709/219
(58) Field of Classification Search .................. 709/223, 709/212, 213, 214, 216, 219
See application file for complete search history.

(56) References Cited

U.S. PATENT DOCUMENTS

| | | | |
|---|---|---|---|
| 5,699,539 A | 12/1997 | Garber et al. | |
| 6,066,658 A * | 5/2000 | Yasuma et al. | 514/338 |
| 6,151,688 A | 11/2000 | Wipfel et al. | |
| 6,154,787 A | 11/2000 | Urevig et al. | |
| 6,606,658 B1 * | 8/2003 | Uematsu | 709/225 |
| 6,950,874 B2 | 9/2005 | Chang et al. | |
| 7,010,661 B2 | 3/2006 | Kamel et al. | |
| 7,502,884 B1 * | 3/2009 | Shah et al. | 710/316 |
| 2003/0014521 A1 * | 1/2003 | Elson et al. | 709/225 |
| 2003/0149800 A1 * | 8/2003 | Bouchet | 709/318 |
| 2007/0288224 A1 * | 12/2007 | Sundarrajan et al. | 703/22 |
| 2008/0005609 A1 * | 1/2008 | Zimmer et al. | 714/5 |

FOREIGN PATENT DOCUMENTS

TW   200606648   2/2006
TW   200627180   8/2006

OTHER PUBLICATIONS

Deqing Chen et al., Garbage Collector Assisted Memory Offloading for Memory-Constrained Devices,Technical Report # 780, Aug. 2003, Computer Science Department, University of Rochester.
Surupa Biswas et al., Memory Overflow Protection for Embedded Systems using Run-time Checks, Reuse and Compression, Journal, 2004, CASES '04, ACM.
Indrajit Poddar et al., Memory leak detection and analysis in WebSphere Application Server: Part 1: Overview of memory leaks, Article, IBM.com, Jun. 28, 2006.
Taiwanese Office Action dated Jul. 28, 2011 for 096150653, which is a corresponding Taiwanese application, that cites US 2003/0014521, US 6606658, US 6154787, TW 200606648, and TW 200627180.

* cited by examiner

*Primary Examiner* — Lan-Dai T Truong
(74) *Attorney, Agent, or Firm* — WPAT, P.C.; Anthony King

(57) ABSTRACT

The present invention relates to a memory management system and method for open platform. The memory management system and method of the present invention utilizes the main spirit of sharing service in open platform. When the used memory in local open platform exceeds an upper limit, the standard service bundle access interface is used for accessing the standard service bundle in remote open platform. Therefore, the standard service bundle in local open platform can be off-loaded to release the memory space so as to resolve the memory shortage problem. The stability of the whole system can be maintained.

17 Claims, 13 Drawing Sheets

SLP(Service Location Protocol)
UPnP(Universal Plug and Play)
Jini(Java Intelligent Network Infrastructure)
⋮

MEMORY MANAGEMENT SYSTEM AND METHOD FOR OPEN PLATFORM

CROSS-REFERENCE TO RELATED APPLICATIONS

This application claims priority to Taiwan Application No. 096150653 filed on Dec. 27, 2007, which is hereby incorporated by reference in its entirety.

BACKGROUND OF THE INVENTION

1. Field of the Invention

The present invention relates to a memory management system and method, and more particularly to a memory management system and method for open platform.

2. Description of the Related Art

In the trend of the evolution of digital home and the rapid development of internet, the development of the application software are gradually focusing on services, e.g., home security, health care, home automation, and audio-visual entertainment, etc. Thus, in order to meet different service requirements of users, facilitate the installation and management of remote applications, and overcome troubles for users in installation and setting, a design of an open software architecture platform is of great importance and necessity. For example, the open service platform proposed by the Open Services Gateway Initiative (OSGi) alliance is one of the solutions.

As the open platform provides open platform architecture, applications of services of various properties can be dynamically loaded according to different requirements from the users, so as to provide diversified services for the users. However, since the service applications can be dynamically added in the open platform, excessive service applications or those incompatible with the capability of the system platform may be loaded, thus leading to the resource overloading or shortage in the open platform.

The open platform and the applications share a memory space of a virtual machine, and the memory space is allocated and used for providing services. Thus, when the available memory space originally set in the virtual machine fails to meet the memory size required in executing all the services, an exception of out of memory may occur, and the thread with the exception will be suspended. However, due to the open and service sharing architecture of the open platform, instances generated by the suspended thread may still be invoked by other applications, so the system cannot reclaim the occupied memory. Therefore, for the whole system, the execution efficiency of other applications in the system may be affected, and even worse, the executed services may be interrupted, resulting in instability of the system.

Examples of the prior art include the following papers and patents: (1) Surupa Biswas, Matthew Simpson, Rajeev Barua, "Memory Overflow Protection for Embedded Systems using Run-time Checks, Reuse and Compression," CASES'4 Sep. 22-25, 2004. (2) ndrajit Poddar, Robbie John Minshall, "Memory leak detection and analysis in WebSphere Application Server," http://www-128.ibm.com/developerworks/websphere/library/techinstances/0606_podda r/0606_poddar.html, Jun. 28, 2006. (3) Chen, D. Messer, A. Milojicic, D. Sandhya Dwarkadas, "Garbage collector assisted memory offloading for memory-constrained devices," Mobile Computing Systems and Applications 2003, Oct. 9-10, 2003. (4) U.S. Pat. No. 7,010,661 B2 entitled "Efficient Service Management in Home Gateways." (5) U.S. Pat. No. 5,699,539 entitled "Virtual memory management system and method using data compression." (6) U.S. Pat. No. 6,950,874 entitled "Method and system for management of resource leases in an application framework system." (7) U.S. Pat. No. 6,151,688 entitled "Resource management in a clustered computer system."

According to the techniques disclosed in the above technical papers and patents of the prior art, some memory checking mechanisms are added to avoid the exception of out of memory. Or, the instances are compressed during the execution and other memory spaces are shared and utilized to achieve enough available space. Or, the concept of distribution is adopted to effectively utilize and share the resources. However, the prior art cannot efficiently solve the problem of insufficient memory resources, and does not meet the basic open and simple spirit of the open platform standard. Thus, generally, the above techniques are not applicable to homes.

Therefore, it is necessary to provide a memory management system and method for open platform, so as to solve the above problems.

SUMMARY OF THE INVENTION

Accordingly, the present invention is directed to a memory management system for open platform, which includes a local open platform. The local open platform includes a Central Processing Unit (CPU) monitoring bundle, a memory (MEM) monitoring bundle, a discovering bundle, a management agent bundle, and a proxy bundle. The CPU monitoring bundle dynamically monitors the current CPU usage. The memory monitoring bundle dynamically monitors the current MEM usage. The discovering bundle dynamically scatters the CPU and MEM usage information in the internet, and searches the internet to retrieve information accessible to at least a remote open platform. The management agent bundle determines a remote open platform candidate when the memory exceeds a threshold, and initiates a standard service request. The remote open platform candidate registers a standard service bundle access interface in the extended service registry of the local open platform, such that the local end may access corresponding standard service instances provided by the local service registry of the remote open platform through the standard service access interface, and further access the corresponding standard service provided by the remote open platform candidate.

The present invention is also directed to a memory management method for open platform. The method includes: dynamically monitoring the current CPU and MEM usage of a local open platform; dynamically scattering CPU and MEM usage information in the internet, and searching the internet to retrieve information accessible to at least a remote open platform; determining a remote open platform candidate when the memory exceeds a threshold, and initiating a standard service request; and generating a corresponding standard service access interface, for accessing the standard service provided by the remote open platform candidate.

Through the system and method of the present invention, problems caused by out of memory in an open platform can be solved in the absence of the professional managers, and thus the stability in operation is maintained, and troubles for users and managers are overcome. In particular, the system and method of the present invention may access a common standard service bundle generated by the remote open platform. Therefore, the corresponding standard service bundle in the local open platform is off-loaded to force the release of the memory space. Thus, the stability of the system is maintained. Moreover, the execution of service applications can be continued under the circumstance that the system does not

DETAILED DESCRIPTION OF THE INVENTION

Figure 1:
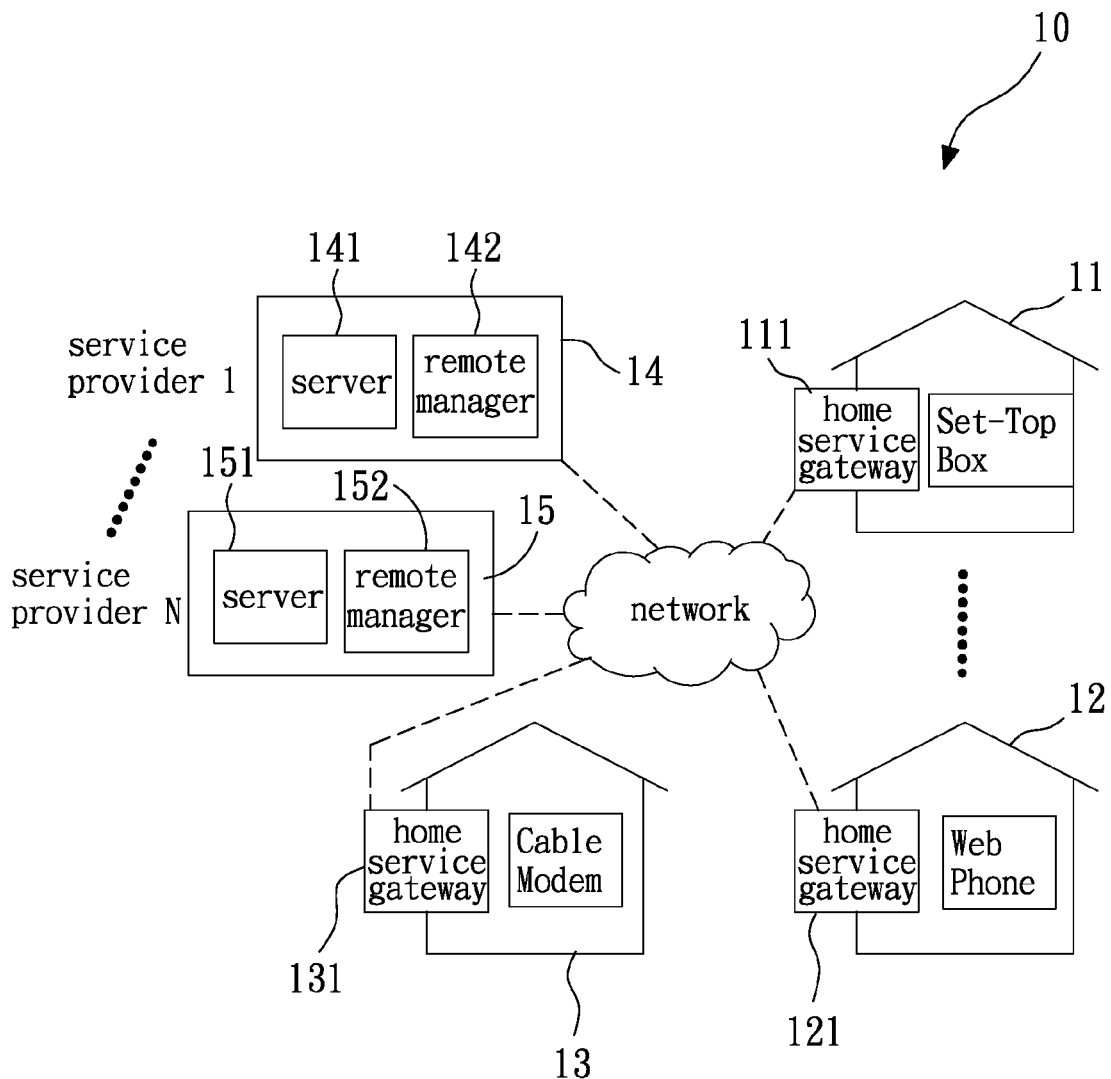
FIG. 1 is a schematic system architectural view of a memory management system and method for open platform according to the present invention.

Referring to FIG. 1, a schematic system architectural view of a memory management system and method for open platform according to the present invention is shown. The system 10 adopting the memory management system for open platform of the present invention includes a plurality of homes 11, 12, 13, and a plurality of service providers 14, 15. The service provider 14, 15 includes a server 141, 151 and a remote manager 142, 152. The homes or the service providers respectively have various equipments with open platforms, for example, home service gateways 111, 121, 131, cable modems, set-top boxes, web phones, and the like. Such equipments may be distributed in the homes, and serially-connected together through the internet. Although the user equipments have different functions, the user equipments are all constructed on open platforms, and have the same standard service bundle instances. Thus, when the problem of out of memory occurs at the local end, the basic spirit of sharing service in open platform is utilized to require the remote open platform to generate corresponding standard common service bundle instances. Further, the standard service bundle is accessed and the corresponding standard service bundle is removed at the local end, so as to force the release of the memory, and make the system to continue operating normally.

Figure 2:
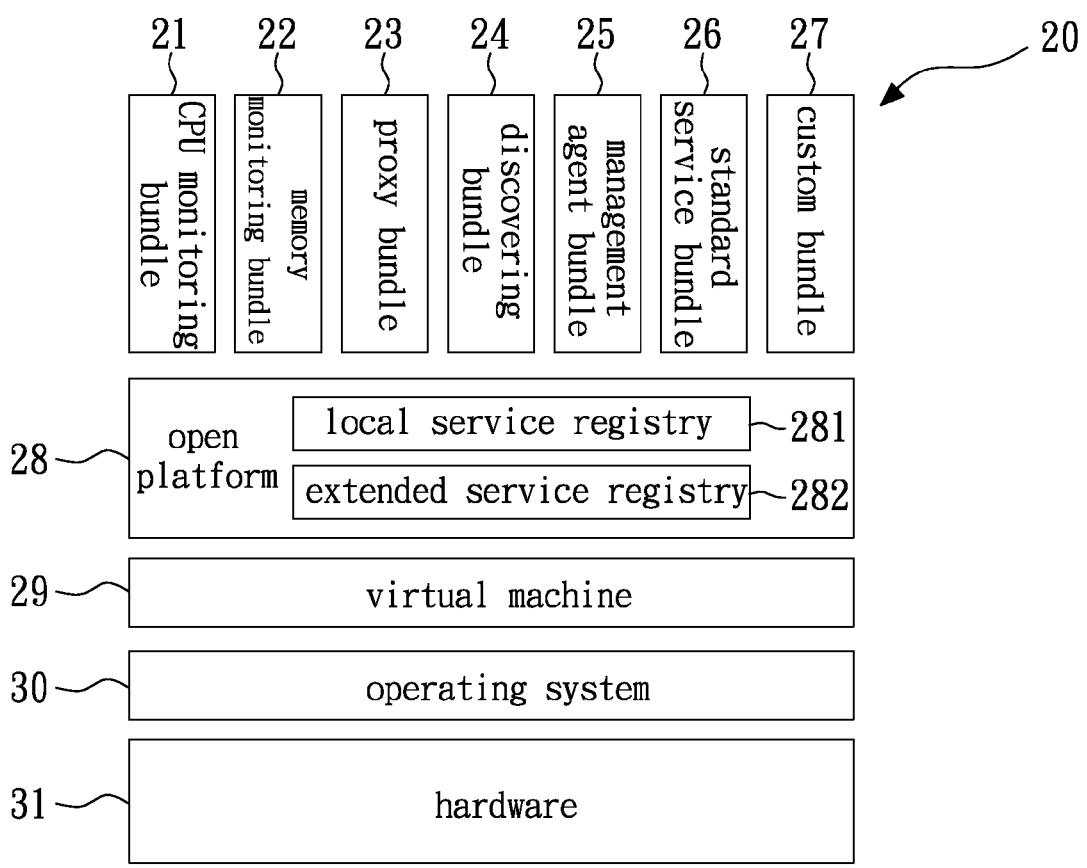
FIG. 2 is a schematic block view of a memory management system for open platform according to the present invention.

Referring to FIG. 2, a schematic block view of a memory management system for open platform according to the present invention is shown. The memory management system of the present invention has a local open platform 20. The local open platform 20 includes a CPU monitoring bundle 21, a memory monitoring bundle 22, a proxy bundle 23, a discovering bundle 24, a management agent bundle 25, a plurality of standard service bundles 26, and a plurality of custom bundles 27.

The CPU monitoring bundle 21 dynamically monitors the current CPU usage. The memory monitoring bundle 22 dynamically monitors the current MEM (memory) usage. The discovering bundle 24 dynamically scatters the CPU and MEM usage information in the internet, and searches the internet to retrieve information accessible from at least one remote open platform. The management agent bundle 25 determines a remote open platform candidate when the memory exceeds a threshold, and initiates a standard service request. The proxy bundle 23 generates a corresponding standard service access interface according to a request by the remote open platform, so as to enable the remote open platform to access the standard service in the local open platform.

The local open platform 20 further includes an open platform 28. The open platform 28 includes a local service registry 281 and an extended service registry 282. The open platform 28 is constructed on a virtual machine 29, and the local open platform 20 further includes an operating system 30 and a hardware 31.

The remote open platform candidate registers a standard service bundle access interface in the extended service registry 282 of the local open platform 20, such that the local end may access corresponding standard service instances provided by the local service registry of the remote open platform through the corresponding standard service access interface, and further access the corresponding standard service provided by the remote open platform candidate.

Figure 3:
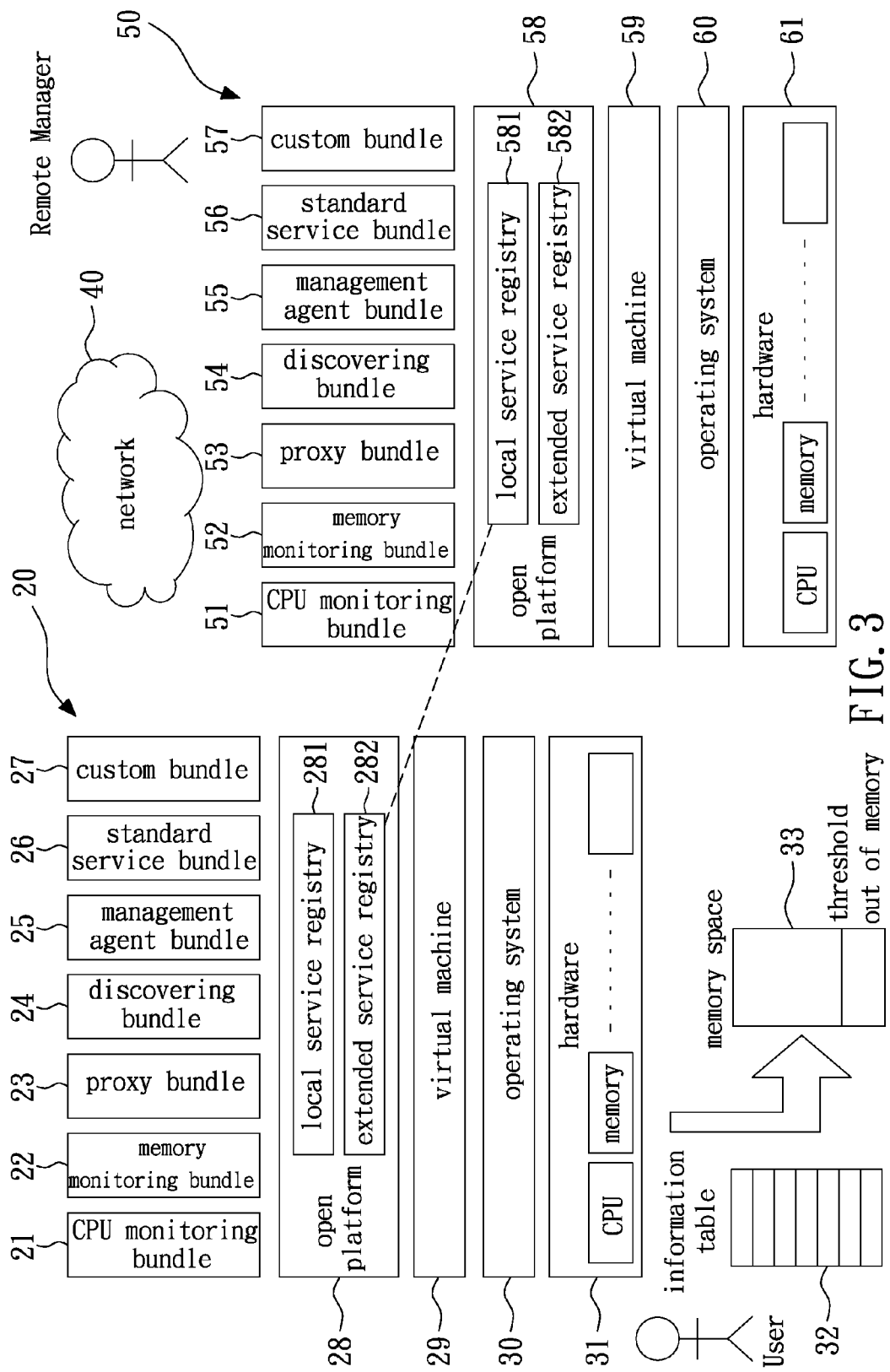
FIG. 3 is a schematic block view of a memory management system for open platform when out of memory according to the present invention.

Referring to FIG. 3, a schematic block view of a memory management system for open platform when running out of memory according to the present invention is shown. Besides the local open platform 20, the memory management system of the present invention further includes a remote open platform 50. The system architecture of the remote open platform 50 is substantially the same as that of the local open platform 20, and includes a CPU monitoring bundle 51, a memory monitoring bundle 52, a proxy bundle 53, a discovering bundle 54, a management agent bundle 55, a plurality of standard service bundles 56, and a plurality of custom bundles 57.

The CPU monitoring bundle 51 of the remote open platform 50 dynamically monitors the current CPU usage. The memory monitoring bundle 52 dynamically monitors the current MEM usage. The discovering bundle 54 dynamically scatters the CPU and MEM usage information in the internet, and searches the internet to retrieve information accessible from at least one remote open platform. The management agent bundle 55 receives a standard service request from the local open platform. The proxy bundle 53 generates a corresponding standard service, so as to enable the local open platform to access the standard service.

Similarly, the remote open platform 50 further includes an open platform 58. The open platform 58 includes a local service registry 581 and an extended service registry 582. The open platform is constructed on a virtual machine 59, and the remote open platform 50 further includes an operating system 60 and a hardware 61.

The operation of the memory management system and method for open platform of the present invention is described below with reference to the accompanying drawings.

Figure 4:
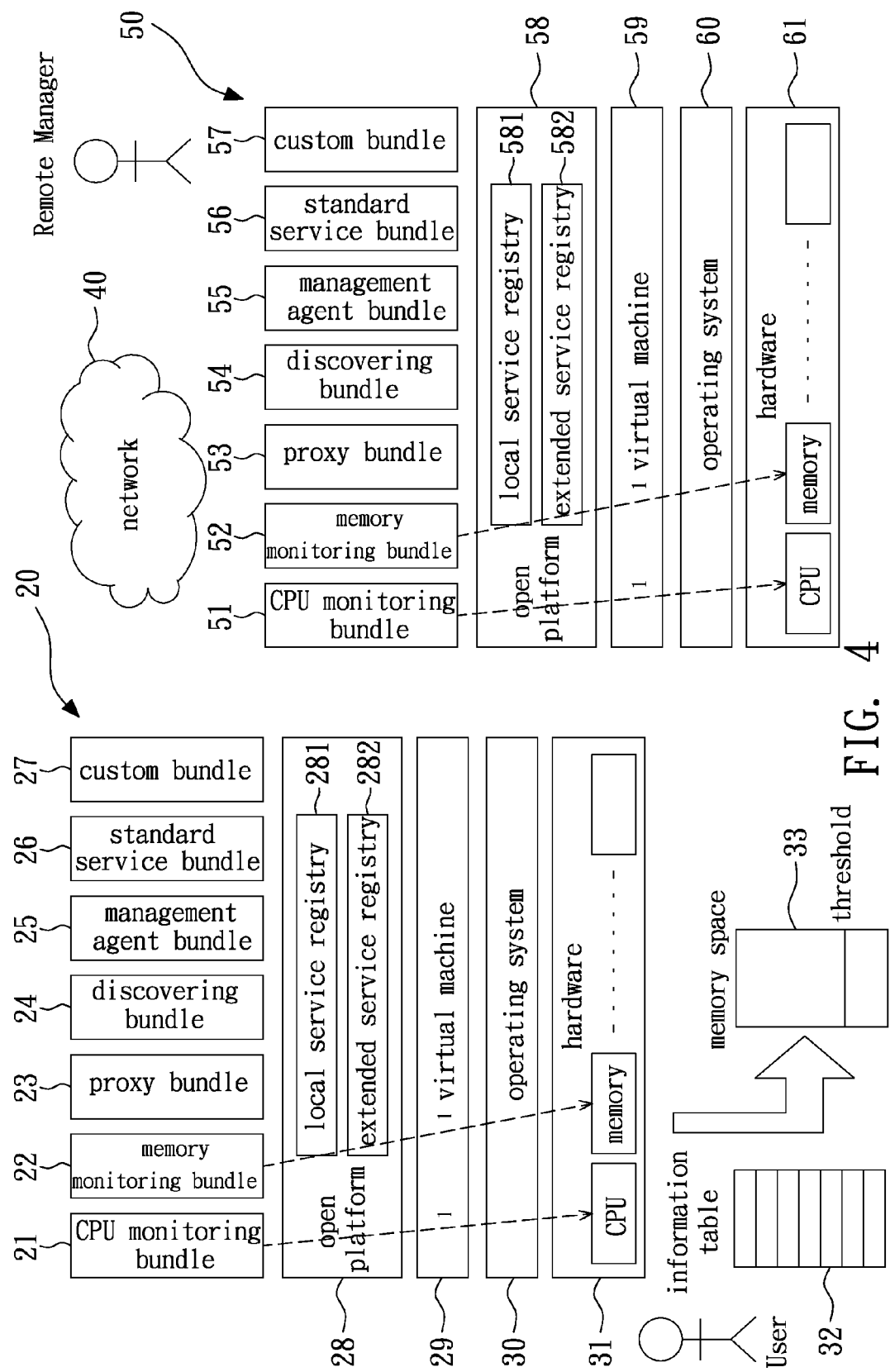
FIG. 4 is a schematic process flow chart of Step 1 of the memory management method for open platform according to the present invention.

Referring to FIG. 4, a schematic process flow chart of Step 1 of the memory management method for open platform according to the present invention is shown. After the system is started, each open platform (e.g., the local open platform 20 and the remote open platform 50) may directly load and actuate the five service bundles i.e. the CPU monitoring bundles 21, 51, the memory monitoring bundles 22, 52, the proxy bundles 23, 53, the discovering bundles 24, 54, and the management agent bundles 25, 55. In addition, the CPU monitoring bundles 21, 51 and the memory monitoring bundles 22, 52 dynamically monitor and collect the current CPU and MEM usage by means of background execution, as shown by Step 1 in FIG. 4.

Figure 5:
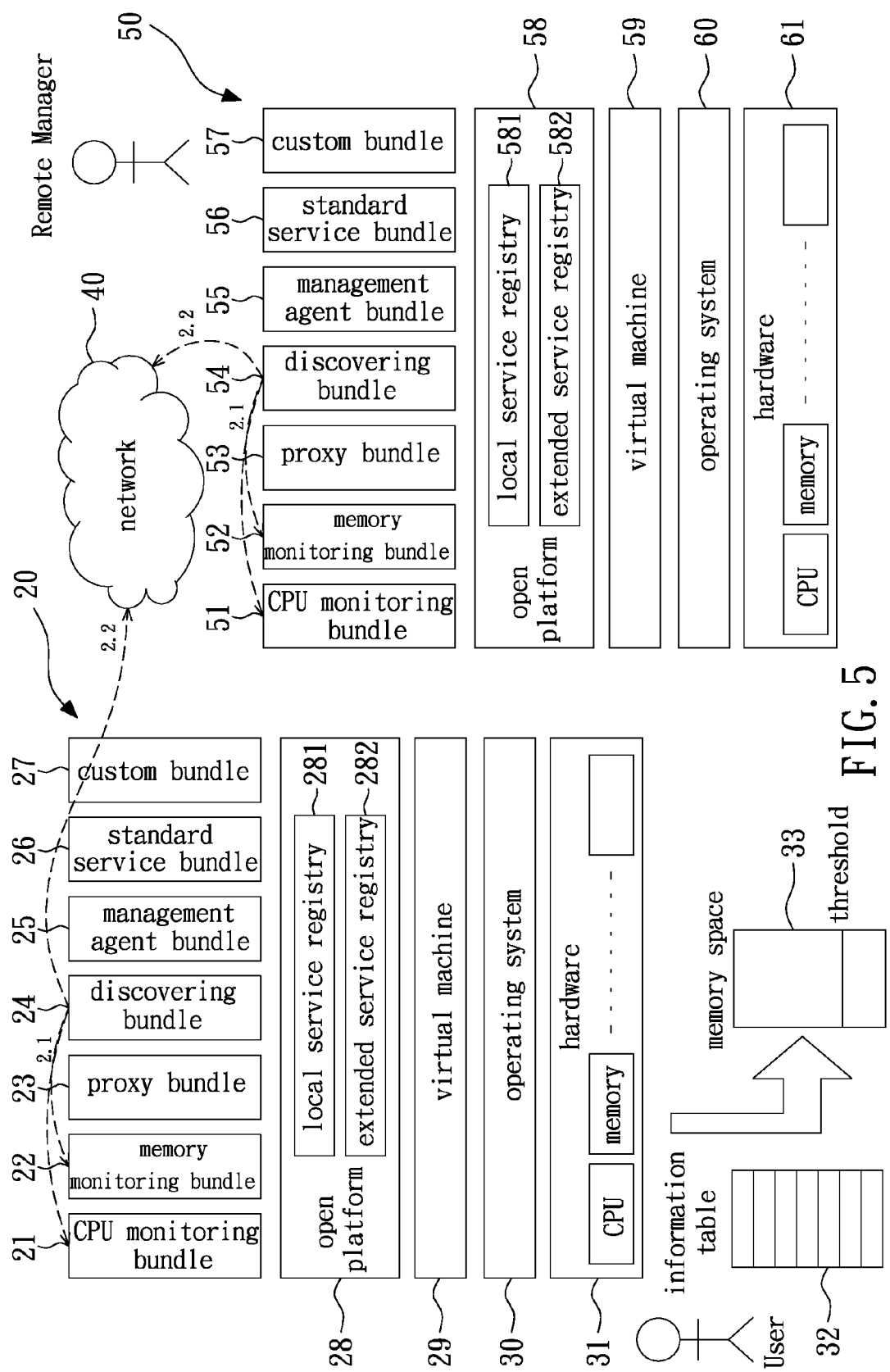
FIG. 5 is a schematic process flow chart of Step 2 of the memory management method for open platform according to the present invention.

Referring to FIG. 5, a schematic process flow chart of Step 2 of the memory management method for open platform according to the present invention is shown. The discovering bundles 24, 54 dynamically query the CPU monitoring bundles 21, 51 and the memory monitoring bundles 22, 52 for the current CPU and MEM usage, as shown by Step 2.1 in FIG. 5, and dynamically scatter the information in the internet 40, as shown by Step 2.2 in FIG. 5.

Figure 6:
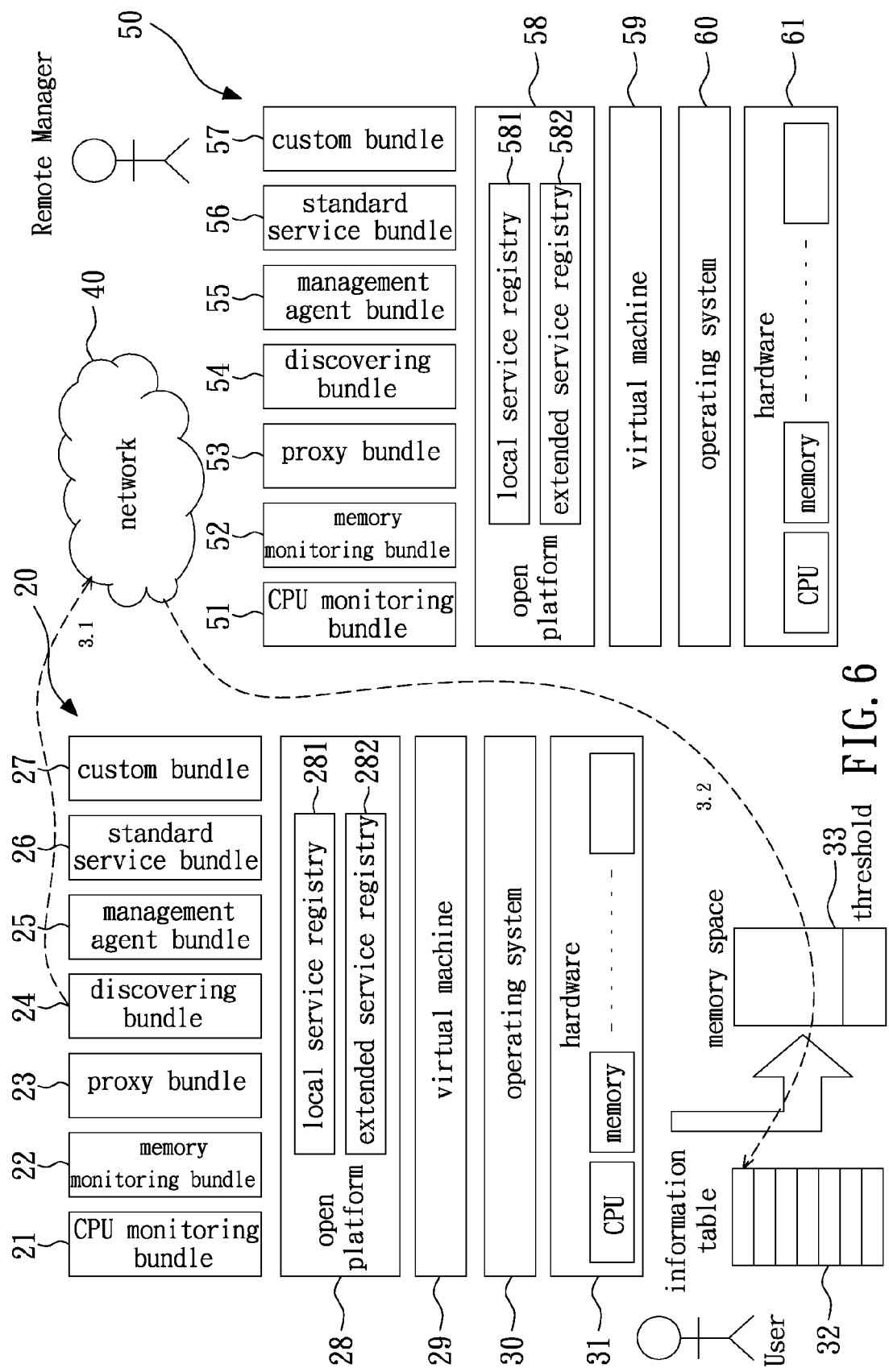
FIG. 6 is a schematic process flow chart of Step 3 of the memory management method for open platform according to the present invention.

Referring to FIG. 6, a schematic process flow chart of Step 3 of the memory management method for open platform according to the present invention is shown. After scattering the CPU and MEM usage information in the individual open platform in the internet 40, the discovering bundles 24, 54 also dynamically search the internet 40 to retrieve information accessible from at least one remote open platform, as shown by Step 3.1 in FIG. 6, then record the information into a local information table 32, and dynamically update the recorded information, as shown by Step 3.2 in FIG. 6. The information table 32 records information about IP address, CPU usage, MEM usage, and time to live (TTL) of each remote open platform.

Figure 7:
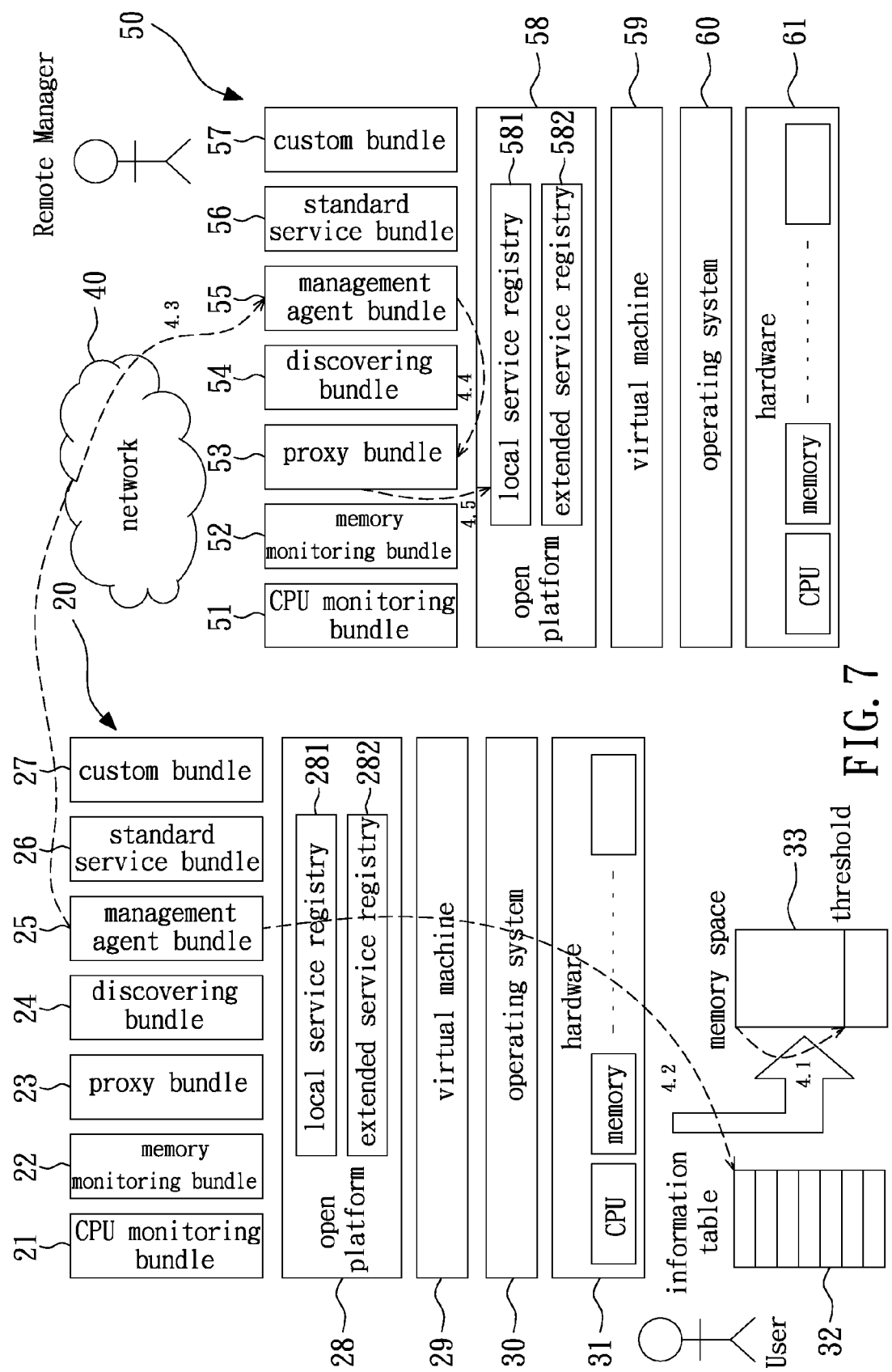
FIG. 7 is a schematic process flow chart of Step 4 of the memory management method for open platform according to the present invention.

Referring to FIG. 7, a schematic process flow chart of Step 4 of the memory management method for open platform according to the present invention is shown. The situation that the system is started and operates normally, and the memory dynamically used in the local end exceeds a threshold is as shown by Step 4.1 in FIG. 7. According to the information recorded in the information table 32, the local management agent bundle 24 evaluates and weights the information about each remote open platform, such as TTL, CPU Usage, and MEM Usage, so as to determine a remote open platform candidate, as shown by Step 4.2 in FIG. 7. In this embodiment, the remote open platform candidate is the remote open platform 50.

The local management agent bundle 25 initiates a standard service request to the remote open platform 50 through the remote management agent bundle 55 according to the determination result of the candidate, as shown by Step 4.3 in FIG. 7. After receiving the request, the management agent bundle 55 in the remote open platform first requires the proxy bundle 53 to create instances of the standard service according to the request, as shown by Step 4.4 in FIG. 7. On receiving the request from the management agent bundle 55 in the remote open platform, the proxy bundle 53 in the remote open platform generates corresponding standard service instances in the local service registry 581, as shown by Step 4.5 in FIG. 7.

Figure 8:
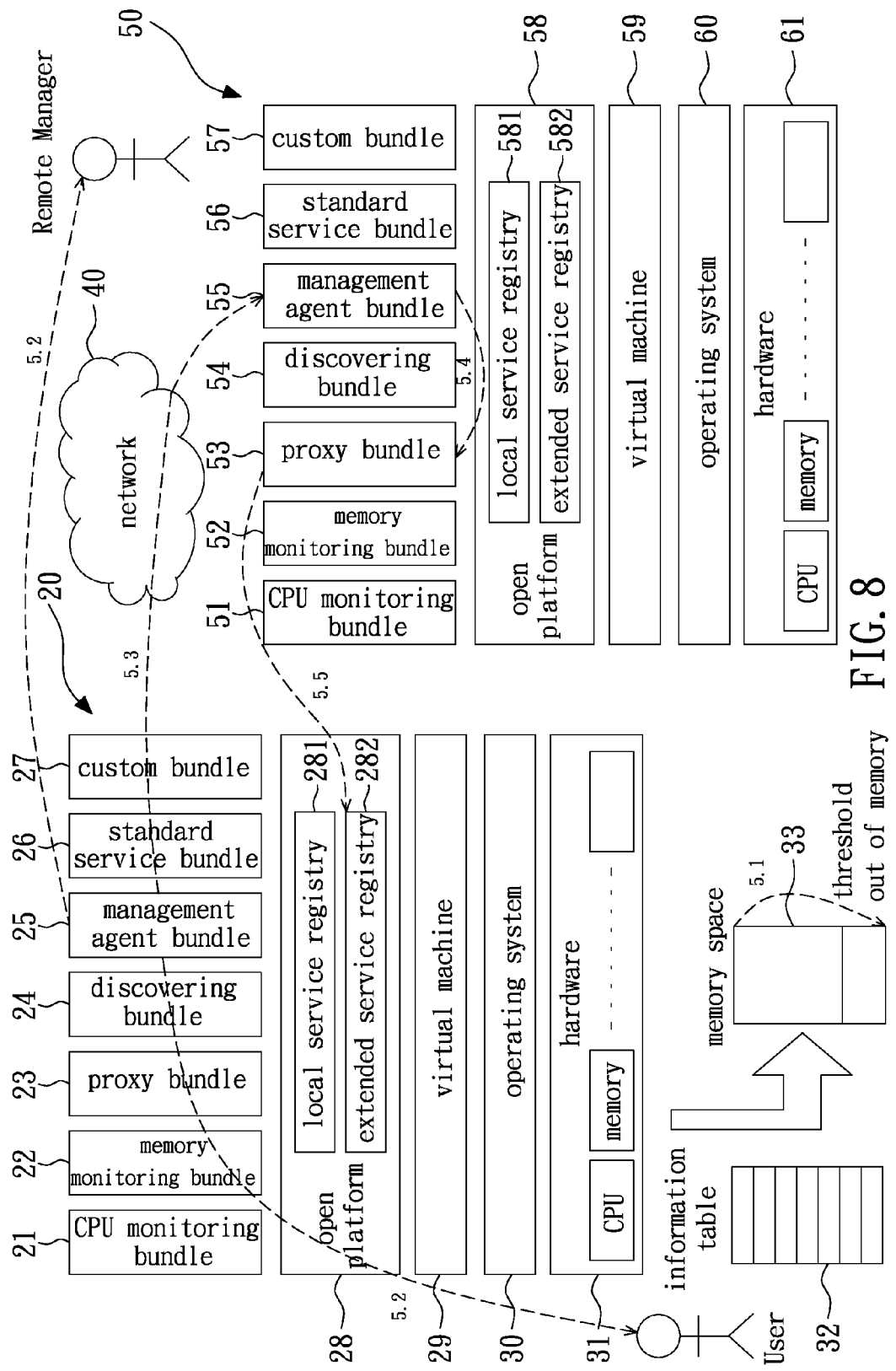
FIG. 8 is a schematic process flow chart of Step 5 of the memory management method for open platform according to the present invention.

Referring to FIG. 8, a schematic process flow chart of Step 5 of the memory management method for open platform according to the present invention is shown. When new application programs are continuously executed at the local end, if the memory space required by an application program exceeds the memory size available in the system, as shown by step 5.1 in FIG. 8, the management agent bundle 25 first informs the remote manager and user of the relevant messages, as shown by Step 5.2 in FIG. 8. Thus, the user may not feel bad due to the related delays, and the manager may acquire the information of out of memory at the local end.

Then, the local management agent bundle 25 initiates an actual request of standard service bundle to the management agent bundle 55 in the remote open platform, as shown by Step 5.3 in FIG. 8. After receiving the request, the management agent bundle 55 in the remote open platform accordingly requires the proxy bundle 53 in the open platform to create a corresponding standard service access interface in the extended service registry 282 of the local open platform 20 that initiates the actual request, as shown by Step 5.4 in FIG. 8.

After receiving the request from the management agent bundle 55 in the remote open platform 50, the proxy bundle 53 generates a corresponding standard service access interface in the extended service registry 282 of the local open platform 20 that initiates the actual request, for the local open platform 20 to use, as shown by Step 5.5 in FIG. 8.

Figure 9:
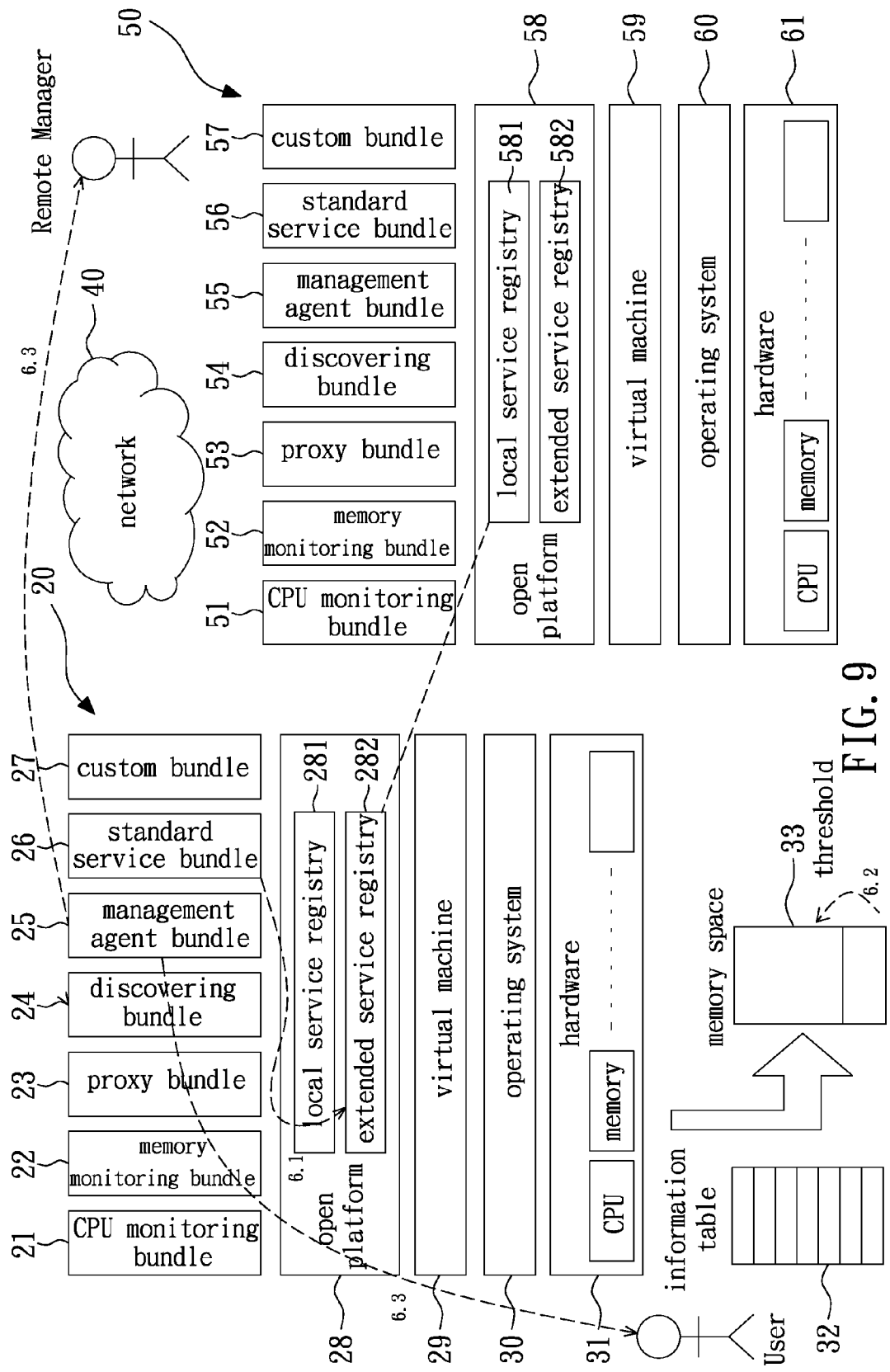
FIG. 9 is a schematic process flow chart of Step 6 of the memory management method for open platform according to the present invention.

Referring to FIG. 9, a schematic process flow chart of Step 6 of the memory management method for open platform according to the present invention is shown. After the remote open platform 50 successfully registers the standard service bundle access interface, the local open platform 20 may access the standard service instances provided by the local service registry 581 in the remote open platform 50 through the standard service access interface in the extended service registry 282, and further access the standard service provided by the remote open platform 50, as shown by Step 6.1 in FIG. 9.

After accessing the corresponding standard service provided by the remote open platform 50, the corresponding standard service bundles in the local open platform 20 are off-loaded to release the memory space, as shown by Step 6.2 in FIG. 9. After the whole conversion is successfully completed, the local open platform 20 starts to access instances of the standard service bundles provided by the remote open platform 50, such that the system may continue to execute new applications programs without needing to reboot and operate normally. Finally, after the whole conversion mechanism is completed, the management agent bundle 25 in the local open platform 20 informs the manager and user whether the conversion succeeded or not, as shown by Step 6.3 in FIG. 9. As the memory management method for open platform of the present invention adopts the architecture of open platforms, the aforementioned convertible standard service bundles are standard service bundles available and executed in each open platform, for example, open home service gateway.

Figure 10:
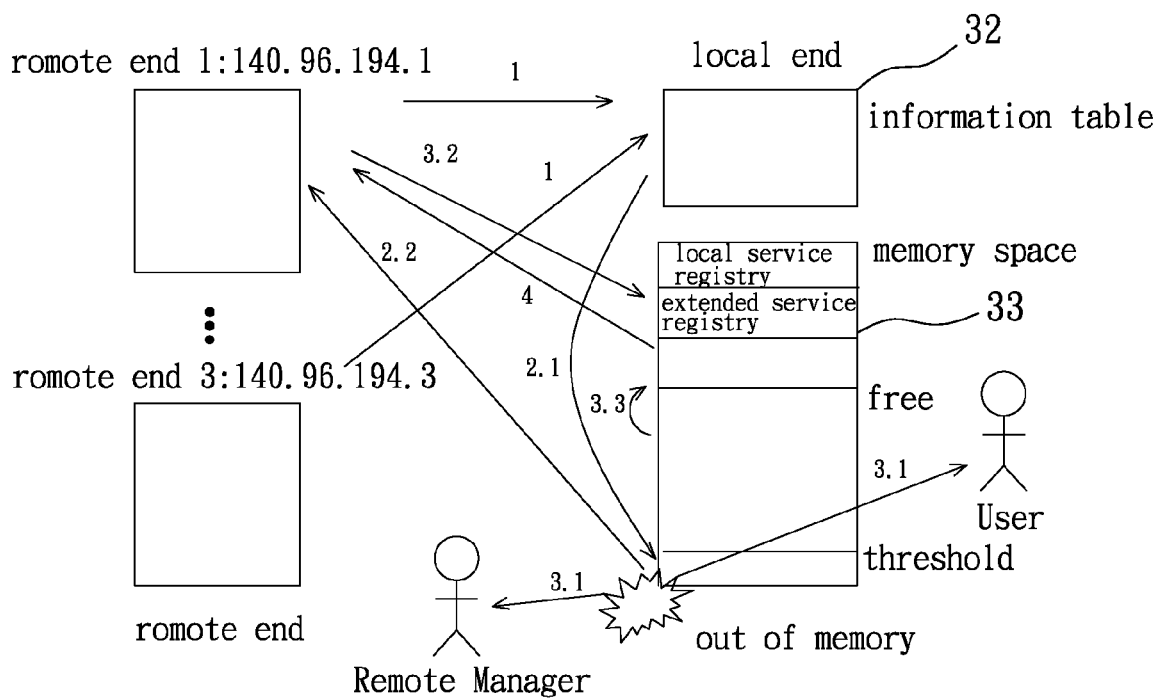
FIG. 10 is a schematic action flow chart of a memory management method for open platform according to an embodiment of the present invention.

An OSGi home service gateway currently available in the market is taken as an example below, for illustrating the implementation of the system architecture and method of the present invention. For example, Knopflerfish OSGi open service middleware programs are executed in four computers, so as to simulate one local equipment and three remote equipments. After all the virtual machines are actuated, each is allocated with a memory size of 18 Mbytes, and the threshold of the memory is set as 16 Mbytes. Referring to FIG. 10, a schematic action flow chart of a memory management method for open platform according to an embodiment of the present invention is shown, and the steps are illustrated below.

Figure 11:
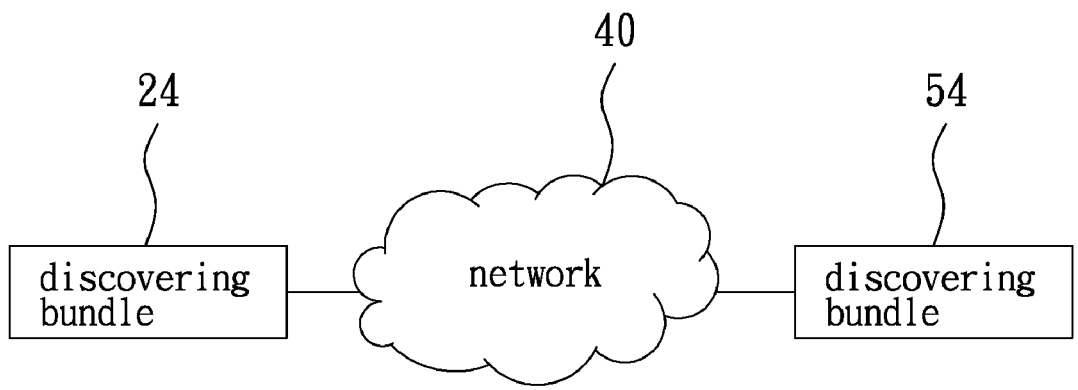
FIG. 11 is a schematic view of a standard communication protocol for the discovering bundle according to the present invention.

In Step 1, after the system is started, the four OSGi home service gateways utilize two service bundles i.e. CPU monitoring bundle and memory monitoring bundle to collect the CPU and MEM usage by means of background execution, respectively. The discovering bundle may use a standard communication protocol with Auto Discovering function, for example, Service Location Protocol (SLP), Universal Plug and Play (UPnP), or Java Intelligent Network Infrastructure (Jini), so as to scatter the corresponding information in the internet and collect information about the currently available remote open platform and its remote services, as shown in FIG. 11. In this embodiment, a light SLP is used to implement the standard communication protocol with Auto Discovering function for the discovering bundle. The collected information contains IP address, CPU usage, MEM usage, and so on. Then, a network instruction "Ping" is used to indirectly obtain the relevant information about TTL, then store the information into the information table 32 of each OSGi home service gateway, and dynamically update the information table 32. In this embodiment, only three items of information: CPU usage, MEM usage, and TTL are stored, and the weighs thereof are set to be 35%, 30%, and 25% respectively, for determining the remote open platform candidate, as shown in Table 1.

| IP Address | Free Memory Size (35%) | CPU Usage (30%) | TTL (25%) |
|---|---|---|---|
| 140.96.194.1 | 12,368 KB | 34.7% | 128 |
| 140.96.194.2 | 2,872 KB | 27.4% | 128 |
| 140.96.194.3 | 6,680 KB | 79.3% | 128 |

In Step 2, after the system is started and operates normally, some service bundles allocated with memories are intentionally executed on the local end, and thus the MEM usage of the local virtual machine is approximate to 15 Mbytes. Then, a service bundle designed to be allocated with a memory size of 2 Mbytes is loaded at the local end, and at this time, the local MEM usage may exceed the threshold of 16 Mbytes, as shown by Step 2.1 in FIG. 10. Thus, according to the information recorded in the information table motioned in Step 1 of this embodiment in FIG. 10, the local end evaluates and weights the three items of information about each remote open platform, such as CPU Usage, MEM Usage, and TTL, so as to determine the optimal remote open platform candidate. In this embodiment, the IP address of the remote open platform candidate is 140.96.194.1, i.e., the remote 1.

Therefore, the local open platform finally initiates a standard service request to the remote OSGi home service gateway with the IP address 140.96.194.1 through the management agent bundle. Further, in this embodiment, two standard service bundles i.e. "Log" and "User Admin" are chosen to be the standard service bundles required by the remote open platform. On receiving the request, the management agent bundle in the remote open platform creates the instances of the standard service bundles in the local service registry through the proxy bundle according to the request, as shown by Step 2.2 in FIG. 10.

Figure 12:
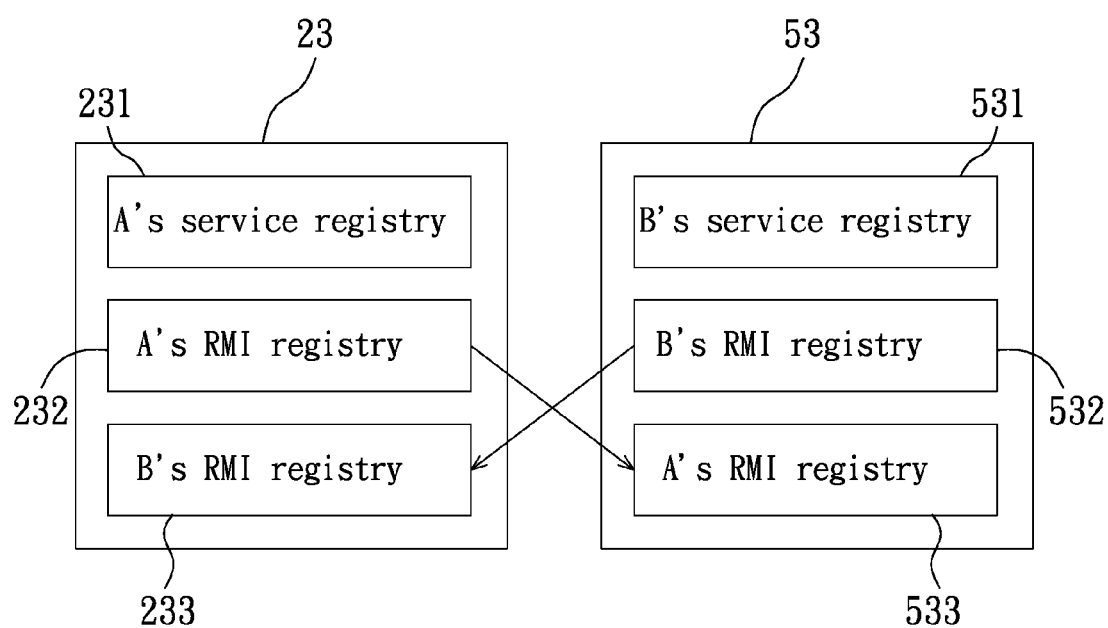
FIG. 12 is a schematic view of implementing the proxy bundle through the Remote Method Invocation (RMI) technique according to the present invention.

In this embodiment, the Remote Method Invocation (RMI) is adopted to implement the proxy bundle, as shown in FIG. 12. In this embodiment, End A or B is used as the local end or the remote end. The proxy bundle 23 in the local open platform includes an A's service registry 231, an A's RMI registry 232, and a B's RMI registry 233. The proxy bundle 53 in the remote open platform includes a B's service registry 531, a B's RMI registry 532, and an A's RMI registry 533. The RMI technique supports remote registry service and provides remote service access, such that through the RMI technique, the local end can register its application services into its service registry, and can also register its application services into the RMI registries of other remote users. Therefore, based on the RMI technique, the local end can not only access its application services, but also access application services provided by other users through the RMI service registries.

Figure 13:
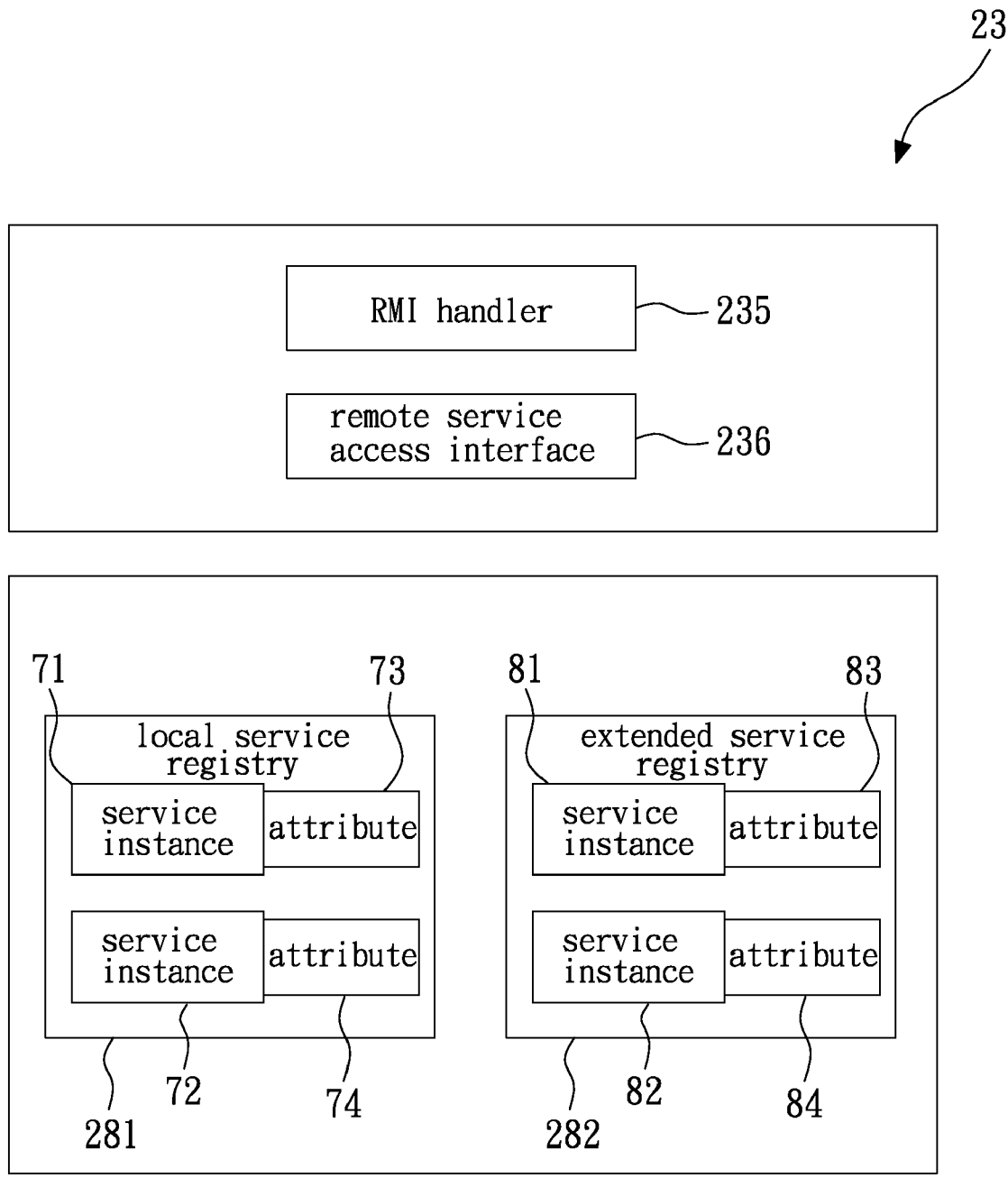
FIG. 13 is a schematic view of practical software modules of the proxy bundle according to the present invention.

Referring to FIG. 13, a schematic view of software modules in the proxy bundle is shown. For example, the proxy bundle 23 in the local open platform includes an RMI handler 235 and a remote service access interface 236. The RMI handler fulfils the main functions of the proxy bundle 23 for supporting the remote registry service and providing remote service access. The remote OSGi home service gateway may provide its standard service to the local open platform through the remote service access interface 236. Finally, in the two service registries of the local service registry 281 and the extended service registry 282 in the local open platform, a plurality of attributes 73, 74, 83, 84 is adopted to determine whether a plurality of service instances 71, 72, 81, 82 belongs to the service instances in the local open platform or the service access interface in the remote open platform.

In Step 3, when a new application program designed to be allocated with a memory size of 2 Mbytes is executed at the local end, and the memory space required by the application program exceeds the memory size available in the system, the method of the present invention is carried out to solve the problem of out of memory. Before the method is performed, the management agent bundle first informs the remote manager and user of relevant messages, as shown by Step 3.1 in FIG. 10, such that the manager and user may acquire the information of out of memory at the local end. Then, the local end initiates an actual request of standard service bundle to the remote OSGi home service gateway with the IP address 140.96.194.1 through the management agent bundle. On receiving the actual request, the management agent bundle in the remote open platform accordingly registers the access interfaces of the "Log" and "User Admin" service bundles to the local open platform through the proxy bundle, as shown by Step 3.2 in FIG. 10. After the remote open platform successfully registers the access interfaces of the standard service bundle instances, the local open platform starts to access the standard service bundle instances in the remote open platform through the access interfaces of the standard service bundle instances. Afterwards, the corresponding standard service bundles in the local open platform are off-loaded to release the insufficient memory space, as shown by Step 3.3 in FIG. 10.

In Step 4, finally, according to experimental results, after the two service bundles i.e. "Log" and "User Admin" in the local open platform are off-loaded, a memory space of 1.7 Mbytes is released. Therefore, when the local end starts to access instances of the standard service bundles provided by the remote end, as shown by Step 4 in FIG. 10, the system may continue to execute the new application program mentioned in Step 3 without needing to reboot and operate normally. After all the processes of the method are completed, the local open platform informs the manager and user whether the conversion succeeded or not.

Finally, it should be clarified that in the Knopflerfish OSGi open service middleware, the standard service bundles can be registered in the remote OSGi home service gateway through the mechanism of the present invention. The service bundles that can be accessed by the remote OSGi home service gateway include Bundle Registry, Declarative Services, JSDK API, Log Service, Measurement, Metatype, Preferences, Misc. Utilities Lib, kSOAP Service API, User Admin. Service, WireAdmin API, XML API, Initial Provisioning, and other standard service bundles. Finally, according to the statistics of the experimental results, a memory space of about 5.24 Mbytes may be released, thereby verifying the practicability and feasibility of the memory management system and method for open platform disclosed in the present invention.

The system and method of the present invention can solve the problems caused by the out of memory in an open platform in the absence of the professional managers, thereby maintaining the stability in operation, and eliminating the troubles of the users and managers. The system and method of the present invention may access a common standard service bundle generated by the remote open platform. Therefore, the corresponding standard service bundle in the local open platform is off-loaded to release the memory space by force. In this manner, the stability of the system is maintained. Moreover, the execution of service applications will be continued under the circumstance that the system does not need rebooting. Thus, the users feel good in using the services, have higher reliability in the application of actual digital life, and have strong willing to use products relevant to the digital life. Therefore, the idea of the convenient digital life becomes embodied.

While the embodiment of the present invention have been illustrated and described, various modifications and improvements can be made by those skilled in the art. The embodiments of the present invention are therefore described in an illustrative but not restrictive sense. It is intended that the present invention may not be limited to the particular forms as illustrated, and that all modifications that maintain the spirit and scope of the present invention are within the scope as defined in the appended claims.

What is claimed is:

1. A memory management system for open platform, the memory management system comprising:
    a local open platform comprises:
    a non-transitory storage medium;
    a CPU monitoring bundle operated on said non-transitory storage medium, to dynamically monitor computing resource of a current CPU usage of the local open platform;
    a memory monitoring bundle operated on said non-transitory storage medium, to dynamically monitor computing resource of a current memory usage (MEM usage) of the local open platform;
    a discovering bundle operated on said non-transitory storage medium, to dynamically scatter computing resource of CPU and MEM usage information in the internet, and searching the internet to retrieve information accessible from at least one remote open platform;
    a management agent bundle operated on said non-transitory storage medium, to determine a remote open platform candidate when the computing resource of the memory usage of the local open platform exceeds a threshold, and initiating a standard service request to the remote open platform candidate; and
    an extended service registry operated to receive registration information from the remote open platform candidate for a standard service bundle access interface, and to store the standard service access interface, so as to access the standard service provided by the remote open platform candidate through the standard service access interface;
    wherein the remote open platform uses the same open platform standard as the local open platform, and the remote open platform has at least one standard service bundle operated on non-transitory storage medium;
    wherein the local open platform has at least one standard service bundle operated on said non-transitory storage medium, the standard service bundle of the at least one remote open platform is the same as the standard service bundle of the local open platform.

2. The memory management system as claimed in claim 1, further comprising at least one remote open platform with a non-transitory storage medium, wherein the remote open platform comprises:
    a CPU monitoring bundle operated on said non-transitory storage medium, to dynamically monitor the current CPU usage;
    a memory monitoring bundle operated on said non-transitory storage medium, to dynamically monitor the current MEM usage; a
    discovering bundle operated on said non-transitory storage medium, to dynamically scatter CPU and MEM usage information in the internet, and search the internet to retrieve information accessible from at least one remote open platform;
    a management agent bundle operated on said non-transitory storage medium, to receive a standard service request initiated by the local open platform; and
    a proxy bundle operated on said non-transitory storage medium, to generate a corresponding standard service access interface to the extended service registry of the local open platform, so as to enable the local open platform to access the standard service.

3. The memory management system as claimed in claim 2, wherein the local open platform and the remote open platform respectively have an information table, to record information about IP address, CPU usage, MEM usage, and time to live (TTL) of the remote open platform.

4. The memory management system as claimed in claim 3, wherein the management agent bundle of the local open platform weighs the information in the information table, so as to determine the remote open platform candidate.

5. The memory management system as claimed in claim 3, wherein the discovering bundle of the local open platform dynamically queries the CPU monitoring bundle, the memory monitoring bundle, and retrieves the current CPU and MEM usage, then dynamically scatters the information in the internet, and records the information into the information table of the local open platform.

6. The memory management system as claimed in claim 2, wherein the local open platform has a proxy bundle, to generate a corresponding standard service access interface required by the remote open platform.

7. The memory management system as claimed in claim 2, wherein the local open platform and the remote open platform respectively have a local service registry, to store corresponding standard service instances.

8. The memory management system as claimed in claim 2, wherein the local open platform and the remote open platform comprise open service platforms adopting an Open Services Gateway Initiative (OSGi) standard.

9. The memory management system as claimed in claim 1, wherein memory space of the local open platform is allocated by a virtual machine in initial.

10. A memory management method for open platform, comprising:

dynamically monitoring, by a CPU monitoring bundle, computer resource of current CPU usage of a local open platform;

dynamically monitoring, by a memory monitoring bundle, computer resource of memory usage of a local open platform;

dynamically scattering, by a discovering bundle computer resource of CPU and MEM usage information in the internet, and searching the internet to retrieve information accessible from at least one remote open platform;

generating, through an extended service registry, a standard service bundle access interface, for accessing the standard service provided by the remote open platform candidate, storing, an extended service registry, the standard service access interface, so as to access the standard service provided by the remote open platform candidate through the standard service access interface;

determining, by a management agent bundle, a remote open platform candidate when computing resource of the memory usage of the local open platform exceeds a threshold, and initiating a standard service request to the remote open platform candidate;

wherein the remote open platform uses the same open platform standard as the local open platform, and the at least one remote open platform has at least one standard service bundle operated on non-transitory storage medium, and wherein the local open platform has at least one standard service bundle operated on said non-transitory storage medium, the standard service bundle of the at least one remote open platform is the same as the standard service bundle of the local open platform.

11. The memory management method as claimed in claim 10, before the dynamic monitoring step, further comprising activating the local open platform to directly load and actuate five service bundles comprising the CPU monitoring bundle, the memory monitoring bundle, the discovering bundle, the management agent bundle, and a proxy bundle.

12. The memory management method as claimed in claim 10, wherein the remote open platform candidate is determined according to information about IP address, CPU usage, MEM usage, and TTL of at least one remote open platform.

13. The memory management method as claimed in claim 12, wherein information about the IP address, the CPU usage, the memory usage, and TTL of at least one remote open platform is stored in an information table of the local open platform, and the information in the information table is weighed to determine the remote open platform candidate.

14. The memory management method as claimed in claim 13, wherein the step of dynamically scattering CPU and MEM usage information in the internet further comprises dynamically querying the current CPU and MEM usage, then dynamically scattering the information in the internet, and recording the information into the information table of the local open platform.

15. The memory management method as claimed in claim 10, wherein after the local open platform initiates a standard service request, the remote open platform candidate receives the standard service request, and stores a corresponding standard service instance in a local service registry.

16. The memory management method as claimed in claim 15, wherein when the local open platform continues to execute new application programs which exceed the available memory size, the local open platform initiates an actual request of standard service bundle to the remote open platform candidate, and the remote open platform candidate receives the actual request of standard service bundle and then generates a corresponding standard service access interface in an extended service registry of the local open platform.

17. The memory management method as claimed in claim 16, wherein after the remote open platform candidate generates a corresponding standard service access interface in an extended service registry of the local open platform, the local open platform accesses the standard service provided by the remote open platform candidate through the corresponding standard service access interface.

* * * * *